United States Patent
Weaver et al.

(10) Patent No.: US 9,029,298 B2
(45) Date of Patent: *May 12, 2015

(54) METHODS AND COMPOSITIONS FOR ENHANCING GUAR HYDRATION RATES AND PERFORMING GUAR DERIVATIZATION REACTIONS

(71) Applicant: Halliburton Energy Services, Inc., Houston, TX (US)

(72) Inventors: Jimmie D. Weaver, Duncan, OK (US); Robert E. Hanes, Jr., Austin, TX (US); Billy F. Slabaugh, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/069,538

(22) Filed: Nov. 1, 2013

(65) Prior Publication Data

US 2014/0057815 A1 Feb. 27, 2014

Related U.S. Application Data

(60) Division of application No. 13/544,529, filed on Jul. 9, 2012, now Pat. No. 8,614,172, which is a continuation of application No. 12/550,116, filed on Aug. 28, 2009, now Pat. No. 8,268,757, which is a continuation-in-part of application No. 11/035,305, filed on Jan. 13, 2005, now Pat. No. 7,637,322.

(51) Int. Cl.
*C09K 8/60* (2006.01)
*C08B 37/00* (2006.01)
*C09K 8/68* (2006.01)
*C09K 8/90* (2006.01)

(52) U.S. Cl.
CPC ............... *C09K 8/60* (2013.01); *C08B 37/0096* (2013.01); *C09K 8/68* (2013.01); *C09K 8/90* (2013.01)

(58) Field of Classification Search
None
See application file for complete search history.

(56) References Cited

U.S. PATENT DOCUMENTS

| | | | | |
|---|---|---|---|---|
| 3,912,713 | A * | 10/1975 | Boonstra et al. | 536/114 |
| 4,269,975 | A * | 5/1981 | Rutenberg et al. | 536/114 |
| 4,959,464 | A * | 9/1990 | Yeh | 536/114 |
| 7,637,322 | B2 * | 12/2009 | Slabaugh et al. | 166/305.1 |
| 8,614,172 | B2 * | 12/2013 | Weaver et al. | 507/210 |
| 2006/0151173 | A1 * | 7/2006 | Slabaugh et al. | 166/308.2 |
| 2008/0033163 | A1 * | 2/2008 | Krishnamurthy et al. | 536/114 |

* cited by examiner

*Primary Examiner* — Alicia Bland
(74) *Attorney, Agent, or Firm* — Craig W. Roddy; Baker Botts L.L.P.

(57) ABSTRACT

Methods are provided that include, but are not limited to, methods of treating guar splits comprising: exposing guar splits to a treatment chemical to create treated guar splits, wherein the treatment chemical comprises at least one treatment chemical selected from the group consisting of: an aqueous salt solution; a caustic solution, and a derivatizing agent; and grinding the treated guar splits to create ground, treated guar splits.

9 Claims, No Drawings

METHODS AND COMPOSITIONS FOR ENHANCING GUAR HYDRATION RATES AND PERFORMING GUAR DERIVATIZATION REACTIONS

CROSS REFERENCE TO RELATED APPLICATION

This application is a divisional of co-pending U.S. patent application Ser. No. 13/544,529, filed Jul. 9, 2012, and is titled "Methods and Compositions for Enhancing Guar Hydration Rates and Performing Guar Derivatization Reactions," which is a continuation of U.S. patent application Ser. No. 12/550,116, which was filed on Aug. 28, 2009, which is a continuation in part of U.S. patent application Ser. No. 11/035,305, which was filed on Jan. 13, 2005, and is titled "Methods and Compositions for Enhancing Guar Hydration Rates and Performing Guar Derivatization Reactions," the disclosures of which are incorporated herein by reference in their entireties.

BACKGROUND OF THE INVENTION

The present invention relates to subterranean treatment fluids. More particularly, the present invention relates to methods and compositions for enhancing guar hydration rates and performing guar derivatization reactions.

Treatment fluids are used in a variety of operations and treatments performed in oil and gas wells. Such operations and treatments include, but are not limited to, production stimulation operations, such as fracturing, and well completion operations, such as hydraulic fracturing, gravel packing and frac packing.

In hydraulic fracturing, a type of treatment fluid, referred to in the art as a fracturing fluid, is pumped through a well bore into a subterranean zone to be stimulated at a rate and pressure such that fractures are formed or enhanced in a desired subterranean zone. The fracturing fluid is generally a gel, emulsion, or foam that may comprise a particulate material often referred to as proppant. When used, proppant is deposited in the fracture and functions, inter alia, to hold the fracture open while maintaining conductive channels through which such produced fluids can flow upon completion of the fracturing treatment and release of the attendant hydraulic pressure.

Gravel packing treatments are used, inter alia, to reduce the migration of unconsolidated formation particulates into the well bore. In gravel packing operations, particulates, referred to in the art as gravel are suspended in a treatment fluid, which may be viscosified, and the treatment fluid is pumped into a well bore in which the gravel pack is to be placed. As the particulates are placed in the zone, the treatment fluid leaks off into the subterranean zone and/or is returned to the surface. The resultant gravel pack acts as a filter to separate formation solids from produced fluids while permitting the produced fluids to flow into and through the well bore. While screenless gravel packing operations are becoming more common, traditional gravel pack operations involve placing a gravel pack screen in the well bore and packing the surrounding annulus between the screen and the well bore with gravel designed to prevent the passage of formation particulates through the pack with produced fluids, wherein the well bore may be oriented from vertical to horizontal and may extend from hundreds to thousands of feet.

In some situations the processes of hydraulic fracturing and gravel packing are combined into a single treatment to provide a stimulated production and an annular gravel pack to prevent formation sand production. Such treatments are often referred to as "frac pack" operations. In some cases the treatments are completed with a gravel pack screen assembly in place with the hydraulic fracturing treatment being pumped through the annular space between the casing and screen. In this situation the hydraulic fracturing treatment ends in a screen out condition creating an annular gravel pack between the screen and casing. This allows both the hydraulic fracturing treatment and gravel pack to be placed in a single operation. In other cases the fracturing treatment may be performed prior to installing the screen and placing a gravel pack.

A variety of methods are used to create the viscosified treatment fluids typically used in subterranean operation. Generally, a polysaccharide or synthetic polymer gelling agent is used to impart viscosity to the treatment fluid to, among other things, enhance proppant or gravel transport and reduce fluid loss from the treatment fluid into the formation. Frequently, a crosslinking agent, such as a metal ion with organic or inorganic counteriion, organometallic or organic compound, is also added to further enhance the viscosity of the fluid by coupling, or "crosslinking," polymer molecules. The treatment fluid may also include one or more of a variety of well-known additives, such as gel stabilizers, fluid loss control agents, clay stabilizers, bactericides, and the like.

Guar gum and guar derivatives are commonly used in the oilfield to manufacture treatment fluids. Guar gum is typically prepared by mechanically and/or chemically treating guar beans to liberate the guar seed endosperm, or "guar splits," from the beans. Guar splits primarily comprise a polymannose backbone with galactose side chains and mannose, and contain a fair concentration of contaminates, such as cellulose, protein, and glycolipids. The guar splits are generally treated under high pressures and temperatures with chemicals, after which they are subjected to multiple washings to remove impurities and salts (which are byproducts of some of the treatments) from the splits. The treated and washed splits are then ground and dried to yield derivatized guars.

The guar powders are typically dispersed into a water-based fluid, such as a 2% KCl solution, and allowed time to hydrate. This dispersion may be accomplished by adding the powdered guar directly to water, or by first creating a liquid slurry, or liquid gel concentrate ("LGC"), of the powder in a non-hydrating solvent, such as diesel. After hydration, the guar fluid is significantly higher in viscosity, making it possible to transport high-density propping agents through pumping equipment and into a subterranean formation.

Despite their widespread use, guar-based treatment fluids do have some technical disadvantages. For example, the time necessary for complete hydration and/or viscosity generation for guar-based fluids may take several minutes. This can be particularly inconvenient during on-the-fly fracturing applications. In order to successfully use guar-based fluids in a continuous fashion requires the use of large volume (i.e., long residence time) holding tanks to permit the hydration of the guar gum. In addition to requiring additional equipment at the well site, this large holding volume limits the ability to change fluid formulations in response to real-time pressure changes that may be measured during the fracturing treatment. Even the derivatization of the guar can prove costly and/or inconvenient, as the derivatization process typically requires large reactors capable of handling dry materials to treat the guar splits, increasing the equipment expense necessary for creating the guar-based fluids.

SUMMARY OF THE INVENTION

The present invention relates to subterranean treatment fluids. More particularly, the present invention relates to methods and compositions for enhancing guar hydration rates and performing guar derivatization reactions.

In one embodiment, the present invention provides a method of treating guar splits comprising: exposing guar splits to a treatment chemical to create treated guar splits, wherein the treatment chemical comprises at least one treatment chemical selected from the group consisting of: an aqueous salt solution; a caustic solution, and a derivatizing agent; and grinding the treated guar splits to create ground, treated guar splits.

In another embodiment, the present invention provides a method of using guar splits comprising: providing ground guar splits that were exposed to at least one treatment chemical prior to the guar splits being ground and allowed to at least partially dry, wherein the at least one treatment chemical is selected from the group consisting of: an aqueous salt solution; a caustic solution, and a derivatizing agent; and hydrating the ground guar splits.

In another embodiment, the present invention provides a method of using guar splits comprising: providing ground guar splits that were exposed to a treatment chemical comprising a salt solution prior to the guar splits being ground and allowed to at least partially dry; and hydrating the ground guar splits.

The features and advantages of the present invention will be readily apparent to those skilled in the art upon a reading of the description of the preferred embodiments that follows.

DESCRIPTION OF PREFERRED EMBODIMENTS

The present invention relates to subterranean treatment fluids. More particularly, the present invention relates to methods and compositions for enhancing guar hydration rates and performing guar derivatization reactions.

In accordance with the teachings of the present invention, guar splits are exposed to a treatment chemical and then ground and dried, for example, ground and dried into a guar powder. According to some embodiments of the present invention, the treatment chemical may comprise a salt, a caustic solution, a derivatizing agent, or a combination thereof. In embodiments in which guar splits are exposed to a treatment chemical comprising a salt, the salt may have the effect of increasing the hydration rate of the guar splits after they have been ground and allowed to dry. In embodiments in which the treatment chemical comprises a caustic solution, the caustic solution may also have the effect of increasing the hydration rate of the guar splits after they have been ground and allowed to dry. In embodiments in which the treatment chemical comprises a derivatizing agent, the derivatizing agent may derivatize the treated guar, e.g., after the treated guar has been ground and allowed to dry. In this fashion, the physical properties of guar gum created from the ground and dried guar splits may be tailored without the use of extensive treatments and/or large equipment expense.

Of the many potential advantages of the methods of the present invention, one advantage may be that after guar splits have been treated as disclosed herein, ground, and allowed to dry, it may take less time to hydrate the resulting guar powder. This reduction in hydration time may be associated with, among other things, less time lost waiting on hydration, and a reduced need for storage for ground and dried guar as it hydrates. In some cases, reduced guar hydration times allow guar powder to be hydrated continuously rather than batch mixed many hours in advance of when it will be used. Additionally, solutions that contain re-hydrated guar powders made from guar splits that were treated in accordance with some of the methods of the present invention, for example guar splits that have been derivatized and exposed to a salt solution before being ground, may have increased viscosity yield (i.e., higher viscosity from a comparable amount of untreated guar split starting material).

According to some embodiments of the present invention, guar splits are treated with a salt. The salt may be used alone, or may be combined with or used in conjunction with a caustic solution and/or a derivatizing agent. In exemplary embodiments, the salt is provided in an aqueous salt solution. The salt solution may desirably have a higher salt concentration than the internal salt concentration of the guar splits that are being treated. In exemplary embodiments, the salt present in the salt solution includes an alkali metal (Group I) monovalent cation. In some embodiments, salts having multivalent, e.g., divalent, trivalent, and tetravalent, cations may be suitable. In some embodiments, treating guar splits with a salt comprising a multivalent cation may be less desirable, because multivalent cations may cause problems later, when the treated guar splits are being processed. In general, the counterion of the salt used should be soluble in the aqueous fluid of the salt solution.

Salts that may be suitable for use in treating guar splits include, but are not limited to, sodium chloride, potassium chloride, lithium chloride, potassium nitrate, sodium nitrate, bromides, nitrates, and buffer salts such as acetates and carbonates, and combinations thereof. It is believed that treating guar splits with a treatment chemical comprising a salt may increase the hydration rate of guar powders that are produced from the treated guar splits. In some embodiments, a salt solution for treating guar splits may be made by mixing about equal volumes of water and a saturated brine. In some embodiments, the salt solution may have a salt concentration in the range of about 5% by weight of the solution to about the saturation point of the salt in solution. In some embodiments, the salt solution may have a salt concentration in the range of about 15% by weight of the solution to about the saturation point of the salt in solution.

Without wishing to be bound by theory, it is thought that when the guar splits are exposed to a salt solution, because there is a lower salt concentration naturally present inside the guar splits than in the salt solution, water from the salt solution enters the guar splits by osmosis. It is also thought that salt from the salt solution migrates with the water as it enters the guar splits, thereby increasing the salt concentration inside the guars splits. Thus, when the treated guar splits are removed from the salt solution, the interior of the guar splits has a higher concentration of salt than before the guar splits were treated with the salt. The time that the guar splits may be exposed to a salt solution may vary depending on the amount of guar splits, the volume of a salt solution, the temperature, and pressure. In exemplary embodiments, the guar splits are removed from the salt solution or the guar splits absorb substantially all of the salt solution before the guar splits take on a gelatinous quality.

After the guar splits have been removed from the treatment solution, they may or may not be washed to remove any treatment solution that is residual on the surface of the guar splits. In some embodiments, guar splits that have been exposed to a treatment chemical are washed before being ground and allowed to dry. In embodiments in which guar splits have been treated with salt solution to increase the hydration rate of guar powder produced from the splits, the increased hydration rate may not be significantly diminished by washing excess salt solution from the surface of the splits prior to grinding. It is thought that washing salt solution off the surface of the un-ground guar splits may not diminish the hydration rate of guar powder produced from the splits, as the salts that are thought to be responsible for the increase in hydration rate have already been imbibed into, i.e., are internal, to the splits prior to grinding.

In other embodiments, there is no washing step before grinding and drying the guar splits. Such exposure to treatment chemicals without subsequent washing may be used to enhance selected properties of the resulting guar gum. In some embodiments, it may be desirable not to wash the guar splits, or, if the guar splits are washed, to avoid prolonged washing that would remove salt that has been imbibed into the interior of the guar split during treatment with a salt solution. In some embodiments, after the guar splits have been removed from a treatment solution, and after an optional washing step if used, the guar splits are ground. While grinding, the water in the interior of the guar splits may at least partially evaporate. The ground guar splits may then be further dried.

In embodiments in which guar splits are treated with a salt solution, ground, and allowed to dry, although the ground guar splits no longer comprise a substantial portion of the water that was imbibed from the salt solution, the ground guar splits have a higher internal concentration of salt, because salt was imbibed into the interior of the guar splits during treatment and before grinding. When these ground guar splits (e.g., guar split powder) are subsequently hydrated, hydration may progress more quickly than would hydration of guar splits that had not been treated.

In particular embodiments of the present invention, guar splits may be treated with a caustic solution to enhance the hydration rates of the resulting guar gum. Moreover, the addition of a caustic solution may make the guar powder more brittle and thus more easily ground. Suitable caustic solutions include, but are not limited to, sodium hydroxide, potassium hydroxide, and lithium hydroxide.

Contrary to common guar processing methods, in some embodiments, after the guar splits have been treated with the caustic solution, the splits are not washed. Rather the treated splits are ground and dried with the caustic solution still on the splits. It is thought that in some situations, proteinaceous material that may be present in guar powder that is used in a subterranean treatment fluid may result in conductivity loss in the subterranean formation. In some embodiments, when exposed to a caustic solution, the proteinaceous material may hydrolyze and form salts that are soluble in water. Thus, by grinding the guar splits with caustic solution still on the splits (i.e., not completely washed off), proteinaceous material that may be present in the interior of the guar splits may hydrolyze when exposed to the residual caustic solution during grinding. Thus, conductivity loss due to proteinaceous material in the ground guar splits may be reduced. In other embodiments, treated guar splits may be washed before grinding.

In other embodiments of the present invention, the guar splits may be treated with a derivatizing agent to derivatize the guar. Generally, the choice of derivatizing agent may depend on the specific derivatization desired. Suitable derivatizing agents are electrophilic, organic compounds capable of reacting with open sites along a polymer. Such open sites may be formed, for example, when the guar splits are ground. In some embodiments, the derivatizing agent may include highly reactive compounds that are reactive to free radicals. Suitable derivatizing agents include, but are not limited to, derivatives of acrylic acid, cationic salts of acrylic acid, acrylic acid esters, and acrylic acid amides. Other suitable derivatizing agents include epoxides, lactones, sultones, oxaphospholanes, alkyl halides, derivatives of quinone (such as hydroquinone), triethanolamine, sodium bisulfite, and sodium thiosulfate. With the benefit of this disclosure, one skilled in the art will be aware of numerous other derivatizing agents suitable for use in the present invention.

Contrary to common guar processing methods, in some embodiments, after the guar splits have been treated with a derivatizing agent, the splits are not washed. Rather the treated splits are ground and dried with the treatment chemical still on the splits. In addition to reducing the guar splits to a powder, the grinding action of the process also creates a number of open sites along the guar polymer. These sites are then free to react with the derivatizing compound as described above. In this fashion, chemical moieties can be grafted directly onto the polymer without the use of expensive reactor techniques.

Whether the chosen treatment chemical is a derivatizing agent, a caustic solution, or a salt solution alone or in combination with one of the foregoing, the treated guar splits are ground and allowed to dry following the treatment. In some embodiments, the splits may be ground in a hammermill or a pulverizer. The splits are commonly ground to a powder, generally to a size of less than about 100 mesh, U.S. Sieve Series. Generally the ground splits are then dried to a moisture content of less than about 20%. In some embodiments the ground splits are dried to a moisture content of less than about 12%. In some embodiments the ground splits are dried using known flash drying methods. As will be appreciated by one skilled in the art, a large number of variations may be affected in the grinding and drying of the guar splits without materially deviating from the scope and spirit of the present invention.

With the benefit of this disclosure, one of ordinary skill in the art will be able to select guar splits that are appropriate for use in the methods of the present invention. Typically, guar splits are produced by separating guar seed endosperms from guar beans. This may be accomplished using a number of mechanical and/or chemical treatments well known in the art. One of ordinary skill in the art, with the benefit of this disclosure, should be able to select an appropriate method of producing guar splits for use in accordance with the teachings of the present invention.

In particular embodiments, a treated guar gelling agent of the present invention may be used in a treatment fluid for use in a subterranean operation, such as fracturing or gravel packing. Such treatment fluids include aqueous gels, foams, and emulsions. The aqueous gels are generally comprised of water and one or more gelling agents. The emulsions may be comprised of two immiscible liquids such as an aqueous gelled liquid and a liquefied, normally gaseous fluid, such as nitrogen. In exemplary embodiments of the present invention, the treatment fluids are aqueous gels comprised of water, a treated guar gelling agent for gelling the water and increasing its viscosity, and, optionally, a crosslinking agent for crosslinking the gel and further increasing the viscosity of the fluid. The increased viscosity of the gelled, or gelled and crosslinked, treatment fluid, inter alia, reduces fluid loss and allows the treatment fluid to transport significant quantities of suspended particulates. The water used to form the treatment fluid may be fresh water, seawater, salt water, brine, or any other aqueous liquid that does not adversely react with the other components.

In addition to the treated guar gelling agents of the present invention, other gelling agents may be used to further viscosify the treatment fluids of the present invention. Suitable additional gelling agents include hydratable polymers that contain one or more functional groups such as hydroxyl, carboxyl, sulfate, sulfonate, amino, or amide groups. Particularly useful are polysaccharides and derivatives thereof that contain one or more of the monosaccharide units galactose, mannose, glucoside, glucose, xylose, arabinose, fructose, glucuronic acid, or pyranosyl sulfate. Examples of natural hydratable polymers containing the foregoing functional groups and units that are suitable for use in accordance with the present invention include, but are not limited to, guar, guar derivatives, hydroxypropyl guar, carboxymethyl guar, xanthan, chitosan, scleroglucan, succinoglycan, starch, biopolymers, and hydroxyethyl cellulose. Hydratable synthetic polymers and copolymers that contain the above-mentioned functional groups (e.g., hydroxyl, carboxyl, sulfate, sulfonate, amino, or amide groups) may also be used. Examples of such synthetic polymers include, but are not limited to, acrylamido-methyl-propane sulfonate ("AMPS"), polyacrylate, polymethacrylate, polyacrylamide, polyvinyl alcohol, and polyvinylpyrrolidone. Generally, these various hydratable polymers and copolymers contain functional groups that allow them to either hydrogen bond with themselves or adjacent polymers or copolymers, or to be crosslinked using an appropriate crosslinking agent.

In particular embodiments, the treatment fluids of the present invention may also include a crosslinking agent. Crosslinking agents typically comprise at least one ion that is capable of crosslinking at least two gelling agent molecules. Examples of suitable crosslinking agents include, but are not limited to, N,N'-methylenebisacrylamide, boric acid, disodium octaborate tetrahydrate, sodium diborate, pentaborates, ulexite and colemanite, compounds that can supply zirconium IV ions (such as, for example, zirconium lactate, zirconium lactate triethanolamine, zirconium carbonate, zirconium acetylacetonate, zirconium malate, zirconium citrate, and zirconium diisopropylamine lactate); compounds that can supply titanium IV ions (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; or a combination thereof. An example of a suitable commercially available zirconium-based crosslinker is "CL-24" available from Halliburton Energy Services, Inc., Duncan, Okla. An example of a suitable commercially available titanium-based crosslinking agent is "CL-39" available from Halliburton Energy Services, Inc., Duncan Okla. Suitable crosslinking agents generally are present in the viscosified treatment fluids of the present invention in an amount sufficient to provide, inter alia, the desired degree of crosslinking between gelling agent molecules. In some embodiments of the present invention, the crosslinking agent may be present in an amount in the range from about 0.001% to about 10% by weight of the water in the treatment fluid. In some embodiments of the present invention, the crosslinking agent may be present in an amount in the range from about 0.01% to about 1% by weight of the water in the treatment fluid. Individuals skilled in the art, with the benefit of this disclosure, will recognize the exact type and amount of crosslinker to use depending on factors such as the specific gelling agent, desired viscosity, and formation conditions.

The gelled or gelled and crosslinked treatment fluids may also include internal delayed gel breakers such as enzyme, oxidizing, acid buffer, or temperature-activated gel breakers. The gel breakers cause the viscous treatment fluids to revert to relatively thin fluids that can be produced back to the surface after they have been used to, for example, place particulates in subterranean fractures. The gel breaker used is typically present in the treatment fluid in an amount in the range of from about 1% to about 5% by weight of the gelling agent. The treatment fluids may also include one or more of a variety of well-known additives, such as gel stabilizers, fluid loss control additives, clay stabilizers, bactericides, and the like.

Generally, the treatment fluids of the present invention are suitable for use in hydraulic fracturing, frac-packing, and gravel packing applications. In exemplary embodiments of the present invention where the treatment fluids are used to carry particulates, the particulates are generally of a size such that formation fines that may migrate with produced fluids are prevented from being produced from the subterranean zone. Any suitable particulate may be used, including graded sand, bauxite, ceramic materials, glass materials, walnut hulls, polymer beads, and the like. Generally, the particulates have a size in the range of from about 4 to about 400 mesh, U.S. Sieve Series. In some embodiments of the present invention, the particulates are graded sand having a particle size in the range of from about 10 to about 70 mesh, U.S. Sieve Series. In particular embodiments of the present invention, the particulates may be at least partially coated with a curable resin, tackifying agents, or some other flowback control agent or formation fine control agent.

To facilitate a better understanding of the present invention, the following examples of preferred embodiments are given. In no way should the following examples be read to limit or define the scope of the invention.

EXAMPLES

Example 1

The effect of various non-covalent additives was evaluated by adding to 200 grams of guar bean splits various additives as listed in Table 1. The mixtures as described in Table 1 were then heated at 150° F. in a roller oven for two hours and then ground with a pulvet grinder, then dehydrated in a vacuum oven to create dehydrated guar flour. Finally, the ground, dehydrated guar flour was stirred into 120 ML of Duncan, Okla. tap water ("dtw"), and the viscosity was measured over time using a Brookfield viscometer (made by PVS, Middleboro, Mass.). The data clearly show that treating guar splits with additives can affect the viscosifying abilities of a resulting guar powder.

TABLE 1

| Treatment formula before grinding and drying TIME | 200 g splits viscosity (cP) | Control 120 cc dtw 200 g splits viscosity (cP) | 10 g urea 120 cc dtw 200 g bean viscosity (cP) | 20 g NaOH 16.95 g LiCl 120 cc dtw 200 g bean viscosity (cP) | 20 g NaOH 23.37 g NaCl 120 cc dtw 200 g bean viscosity (cP) | 20 g NaOH 30 g KCl 120 cc dtw 200 g bean viscosity (cP) | 30.85 g KOH 30 g KCl 120 cc dtw 200 g bean viscosity (cP) |
|---|---|---|---|---|---|---|---|
| 2 | 8.95 | 7.1 | 10.54 | 10.7 | 13.2 | 16.35 | 15.05 |
| 3 | 10.7 | 8.8 | 12.37 | 14.8 | 15.05 | 19.1 | 18.8 |
| 4 | 11.75 | 10.1 | 14.35 | 17.6 | 18.3 | 23.85 | 23.45 |

TABLE 1-continued

| Treatment formula before grinding and drying TIME | 200 g splits viscosity (cP) | Control 120 cc dtw 200 g splits viscosity (cP) | 10 g urea 120 cc dtw 200 g bean viscosity (cP) | 20 g NaOH 16.95 g LiCl 120 cc dtw 200 g bean viscosity (cP) | 20 g NaOH 23.37 g NaCl 120 cc dtw 200 g bean viscosity (cP) | 20 g NaOH 30 g KCl 120 cc dtw 200 g bean viscosity (cP) | 30.85 g KOH 30 g KCl 120 cc dtw 200 g bean viscosity (cP) |
|---|---|---|---|---|---|---|---|
| 5 | 12.7 | 11.85 | 16.1 | 20.2 | 20.6 | 26.55 | 27.5 |
| 10 | 16.6 | 18.4 | 22.65 | 28 | 29.3 | 33.25 | 37.2 |
| 20 | 19.45 | 22.9 | 27.4 | 32.05 | 32.6 | 36.8 | 40.05 |
| 30 | 21.45 | 24.95 | 29.55 | 33.25 | 33.8 | 37.9 | 40.95 |
| 60 | 24.2 | 27.7 | 32.41 | 34.6 | 36.05 | 40.23 | 42.35 |

Example 2

To 100 g of guar bean splits was added 60 g of water, 10 g of NaOH, and 15 g of KCl. Then one of the following derivatizing agents was added: hydroquinone (0.5 g), triethanolamine (0.62 g), sodium bisulfite (0.5 g) and sodium thiosulfate (0.5 g). Two samples served as control using the same recipe with the exception of the addition of the derivatizing agent. These were identical with the exception of maintaining one in an oxygen free environment.

To correct for moisture weight, the samples were analyzed for water content. For hydration testing, the sample effective weight of polysaccharide was added to 250 mL of tap water, 5 g KCl, then the pH was adjusted to 7-7.5 at a temperature of 75-77° F. The change in viscosity versus time was measured until the change was constant. Two hours was arbitrarily chosen as a time where 100% hydration was attained. To correct for variations in particle sizes, the ground particles were sieved and particles retained on the same screen were used for the hydration study described in the above paragraph.

To verify the derivatizing agent had been covalently attached to the guar, the sample was subjected to continuous extraction using a Soxhlet apparatus and dichloromethane. Upon evaporation of the residue, the sample was found only to contain a trace amount of guar bean oil and no excess derivatizing agent or reaction derivatives. This result demonstrates the fate of the derivatizing agent necessarily had to have reacted with the guar.

The data clearly show that treating guar splits with additives can affect the viscosifying abilities of a resulting guar powder.

TABLE 2

| formula TIME (min) | oxygen free control viscosity (cP) | control viscosity (cP) | hydroquinone viscosity (cP) | triethanolamine viscosity (cP) | sodium bisulfite viscosity (cP) | sodium thiosulfate viscosity (cP) |
|---|---|---|---|---|---|---|
| 2 | 8.4 | 6.2 | 5.2 | 8.2 | 6.7 | 7.4 |
| 3 | 10.9 | 8 | 6 | 8.9 | 9.2 | 8.3 |
| 4 | 12.5 | 9.4 | 6.8 | 9.6 | 10.8 | 8.7 |
| 5 | 13.9 | 10.7 | 7.2 | 9.9 | 12.2 | 9.7 |
| 10 | 17.5 | 15 | 8.4 | 10.8 | 15.9 | 10 |
| 20 | 19.1 | 16.5 | 9 | 11.2 | 17.5 | 10.2 |
| 30 | 19.8 | 17.2 | 9.5 | 11.4 | 18.2 | 10.2 |
| 60 | 20.1 | 17.7 | 9.8 | 11.6 | 18.5 | 10.2 |
| 120 | 20.9 | 18.9 | 10.4 | 11.6 | 18.6 | 10.4 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method of treating guar splits comprising:
   exposing guar splits to a derivatizing agent and to a salt solution to create treated guar splits, wherein the derivatizing agent comprises at least one derivatizing agent selected from the group consisting of: a cationic salt of acrylic acid, an acrylic acid ester, a lactone, a sultone, an oxaphospholane, a derivative of quinone, triethanolamine, sodium bisulfite, and sodium thiosulfate and wherein the salt solution comprises at least one salt selected from the group consisting of: sodium chloride, potassium chloride, lithium chloride; and a nitrate;
   grinding the treated guar splits without first washing the treated guar splits to create ground, treated guar splits; and
   drying the ground, treated guar splits.

2. The method of claim 1 wherein the salt solution has a salt concentration in the range of from about 5% by weight of the solution to about the saturation point of the salt in the solution.

3. The method of claim 1 wherein the salt solution has a salt concentration in the range of from about 15% by weight of the solution to about the saturation point of the salt in the solution.

4. The method of claim 1 wherein during the step of drying the ground, treated guar splits, the ground, treated guar splits are dried to a moisture content of less than 12%.

5. The method of claim 1 wherein during the step of grinding the treated guar splits, the treated guar splits are ground to a size of less than about 100 mesh, U.S. Sieve Series.

6. A method of treating guar splits comprising:
exposing guar splits to a derivatizing agent and to a salt solution to create treated guar splits, wherein the derivatizing agent comprises at least one derivatizing agent selected from the group consisting of: a cationic salt of acrylic acid, an acrylic acid ester, a lactone, a sultone, an oxaphospholane, a derivative of quinone, triethanolamine, sodium bisulfite, and sodium thiosulfate and wherein the salt solution has a salt concentration in the range of from about 15% by weight of the solution to about the saturation point of the salt in the solution;
grinding the treated guar splits without first washing the treated guar splits to create ground, treated guar splits; and
drying the ground, treated guar splits.

7. The method of claim 6 wherein the salt solution comprises at least one salt selected from the group consisting of: sodium chloride, potassium chloride, lithium chloride; and a nitrate.

8. The method of claim 6 wherein during the step of drying the ground, treated guar splits, the ground, treated guar splits are dried to a moisture content of less than 12%.

9. The method of claim 6 wherein during the step of grinding the treated guar splits, the treated guar splits are ground to a size of less than about 100 mesh, U.S. Sieve Series.

* * * * *